United States Patent [19]

Sestero

[11] Patent Number: 4,827,236

[45] Date of Patent: May 2, 1989

[54] APPARATUS FOR SIMULTANEOUSLY GENERATING AN INTENSE TOROIDAL MAGNETIC FIELD AND AN INTENSE POLOIDAL MAGNETIC FIELD QUASI-STATIONARILY IN TIME

[75] Inventor: Arrigo Sestero, Rome, Italy

[73] Assignee: Comitato Nazionale per La Ricerca e per Lo Sviluppo deli Energia Nucleare e delle Energie Alternative, Rome, Italy

[21] Appl. No.: 28,110

[22] Filed: Mar. 19, 1987

[30] Foreign Application Priority Data

Mar. 20, 1986 [IT] Italy .............................. 47795 A/86

[51] Int. Cl.$^4$ .............................................. H01F 5/00
[52] U.S. Cl. .................................... 335/299; 335/300
[58] Field of Search .................. 335/296, 299, 300; 336/223, 227

[56] References Cited

U.S. PATENT DOCUMENTS

| | | | |
|---|---|---|---|
| 3,573,691 | 4/1971 | Taylor | 335/299 |
| 3,626,341 | 12/1971 | Dao | 335/299 X |
| 4,344,057 | 8/1982 | Stekly et al. | 335/299 |
| 4,475,096 | 10/1984 | Sestero | 335/299 |

FOREIGN PATENT DOCUMENTS 87830102 6/1988 European Pat. Off. .
3707474 4/1986 Fed. Rep. of Germany .

OTHER PUBLICATIONS

Journal Vacuum Science Technology, A 3 (3), May/-June 1985 pp. 1134–1140.

*Primary Examiner*—George Harris
*Attorney, Agent, or Firm*—Cushman, Darby & Cushman

[57] ABSTRACT

Apparatus for simultaneously generating an intense toroidal magnetic field and an intense poloidal magnetic field in a compact aspect-ratio configuration and quasi-stationarily in time, characterized in that in the inner part of the electrical winding which generates the magnetic field (namely in that part of such winding which is nearest to the toroidal axis of symmetry) the turns of the conductor are tilted approximately 45 degrees relative to the meridian plane. Such said toroidal and respectively poloidal magnetic fields generate largely self-compensating mechanical loads on the winding, thus producing a highly optimized distribution of mechanical stresses in the apparatus, as a result also of favorable spring-like properties of the winding's turns, such properties originating in the turns being tilted. The said stress configuration in the apparatus is also compatible with the fitting of adequately sized cooling ducts between the winding's turns, whenever required. In thermonuclear applications, the toroidal field is needed to stabilize the plasma column in the toroidal bore, and the poloidal magnetic flux variation with the time can be exploited to drive the bulk of the required plasma current. For non-thermonuclear applications, instead, the poloidal magnetic field is the most valuable asset, in that it is produced in a region of space easily accessible from the outside, and because it is stronger than it would otherwise be possible to generate under quasi-stationary conditions.

3 Claims, 3 Drawing Sheets

APPARATUS FOR SIMULTANEOUSLY GENERATING AN INTENSE TOROIDAL MAGNETIC FIELD AND AN INTENSE POLOIDAL MAGNETIC FIELD QUASI-STATIONARILY IN TIME

DESCRIPTION

1. Field of the Invention

The invention is in the domain of the generation of intense quasi-stationary magnetic fields, for general purposes as well as, more specifically, for thermonuclear applications. 2. Background of the Invention and Prior Art The techniques for the generation of intense quasi-stationary magnetic fields have been first developped with reference to poloidal magnetic field configurations (cylindrically-symmetric solenoids) and then taken over to the toroidal magnetic field configurations (toroidally-symmetric solenoids) that are more specifically required in some lines of thermonuclear research.

The key difficulty in the generation of intense magnetic fields lies with the state of strong tensile stress that is induced in the solenoids along the azimuth direction ("small" azimuth direction for the toroidal solenoids). To improve over the situation whereby the current-carrying solenoids are mechanically self-supporting, the option is generally relied upon of transferring part of the load from the conducting material to some sturdier structural material. The structural material can be interposed (in the form of plates) between each pair of turns of the conductor; this solution ("à la Bitter") ensures a very tight mechanical coupling between the conducting material and the structural material, and has indeed been established as most effective for the construction of cylindrical solenoids. For very compact toroidal solenoids, however, the above technique is encumbered by the fact that conducting material and structural material are bitterly competing with each other for space in the very crammed "throat" region of the winding; alternative approaches are therefore often preferred, with the structural material more conveniently positioned around the conducting solenoid. With either solution, pre-compression effects on the conducting material have been found to bring about distinct advantages.

For the case of the toroidal solenoids, furthermore, specific matter of concern is the strong centripetal force which results from the Lorentz force not being uniform along the "small" azimuth of the torus. Such centripetal force is most effectively supported by "wedging", namely by having the turns of the winding lean against each other in the toroidal direction so as to form the architectural structure of an arch. Alternatively, under conditions of moderate magnetic pressure loads, the centripetal force can also be supported by "bucking", namely by having the turns of the winding lean radially head-on against some sturdy structure inserted into the solenoid's doughnut hole.

An original solution to the overall problem of the magnetic pressure loads is offered by a prior patent (U.S. Pat. No. 4,475,096). According to such patent, an external press, synchronized with the waveform of the current in the toroidal solenoid, is made to apply a thrust (parallel to the axis of symmetry) to the region of the winding's throat, to the end of changing the stress tensor therein to a form as nearly isotropic as possible (such feature hence significantly reducing the otherwise very high local value of the "Von Mises stress"). At the expense of having to add some bulky external structure needed to implement the press action, in the said patent the claim is made that with the proposed design a magnetic pressure can be contained which is typically twice as large as would otherwise be possible to contain in terms of techniques belonging to the prior art.

Most of the high field magnets that have been built are "inertially cooled": namely, the magnet's coils are allowed to heat up adiabatically, with no attempt being made at removing the Joule heat during the current pulse. The Joule heat accumulated during the pulse is then slowly extracted, before the start of each new pulse, by circulating a suitable cooling fluid over the exposed surfaces of the conductors. The cooling fluid is usually liquid nitrogen, which sets the starting temperature of the thermal cycle at about $-196°$ C. (liquid nitrogen's boiling temperature under normal pressure), allowing for the exploitation of the reduced value of the electrical resistivity at low temperature. Cooling the conductor solely from its naturally exposed surfaces is however a lengthy and tricky procedure in the case of very high field toroidal solenoids, as one is to effect the extraction of large amounts of heat through thick sections of material. In particular, if a lengthening of the current pulse were to be sought by enforcing active cooling procedures during the very phase of operation of the apparatus, such a goal could certainly not be attained solely by surface cooling of the conductor.

Indeed, substantial improvements in cooling efficiency can only be brought about by carving sizable cooling ducts through the volume of the conductor, which is however often at odds with the need to preserve the overall mechanical structure of the magnet from unduly weakenings. The point which is appropriate to make here is that one cannot trace all the difficulties simply to the fact that the solid conductor and the hollow ducts are competing with each other for space in the highly crammed throat region of the toroidal solenoid: some subtler mechanical features are at play, in that the cooling ducts (no matter how small-sized) can drastically perturb the conductor's state of stress in their vicinity, sometimes giving rise to fundamental incompatibilities with the chosen design phylosophy. An interesting example of such basic design incompatibility can e.g. be found in the already quoted U.S. Pat. No. 4,475,096, within whose framework the carving of cooling ducts of any size within the throat region of the toroidal magnet is found to be fully at odds with the requirement of therein ensuring a condition of quasi-isotropy of the stress tensor.

As a further remark, attention is drawn to the fact that in most thermonuclear research applications the toroidal magnet must be complemented by a set of transformer coils for the inducing of the required plasma current, with the bulk of such additional windings being housed in the already crammed space inside the magnet's doughnut hole. The additional constraints derived therefrom often result in serious limitations of the attainable experimental goals.

Finally, it is to be noted that all the compact high-field toroidal magnet designs belonging to the prior art have been developed solely for exploitation in the domain of thermonuclear research. The possibility of their exploitation in other areas of application of the high magnetic field technology has been in practice dismissed on account of the poor accessibility and awkward geometry of their high magnetic field region.

In conclusion, it is apparent from all the above that the solutions so far envisaged under the prior art, when applied to the generation of compact toroidal magnetic fields of very high intensity, do all still present a number of limitations and inconveniences. In particular, the following problems have been noted to be, among the others, conspicuous: difficulties with the compensation of the mechanical loads; difficulties with the cooling of the conductors; difficulties with the fitting of the additional transformer windings which are required for thermonuclear applications; demand for bulky and costly additional structural means (such as "press" means) for external support; inadequacy for applications in fields other than thermonuclear research.

SCOPE OF THE INVENTION

Scope of the present invention is that of obviating the limitations and inconveniences previously pointed out, by introducing a new, compact, non-encumbering mechanical support scheme, capable of dealing effectively with the problem of mechanical loads, while at the same time being helpful also with respect to such other critical issue as cooling the conductors, generating the required transformer flux (for thermonuclear applications), and providing confortable external access to at least part of the strong field region (for non-thermonuclear applications).

DESCRIPTION OF THE INVENTION

The invention consists of an electromechanical apparatus comprising a current-carrying toroidal solenoid and an external mechanical support structure, the said apparatus being characterized as follows. In the said toroidal solenoid, three regions are distinguished for their different features, namely, an inner region or "throat" region (nearest to the torus's axis of symmetry), a transition region, and an outer region (farthest from the torus's axis of symmetry): see, e.g., the figures and the associated descriptions under the Section devoted to the "Preferred Embodiment". The key feature of the present invention lies in the fact that in the said inner region of the said three regions of the solenoid the turns making up the electrical winding are tilted with respect to the meridian plane, the mean tilt angle (namely, the tilt angle at the winding's half-width) being of the order of 45 degrees. Then in going through the region previously identified as the transition region the said mean tilt angle of the turns is gradually altered and ultimately decreased, so that at the end of the said transition region and throughout the region previously identified as the outer region the turns are only slightly deflected relative to the meridian plane. The precise value (or even the sign) of the turn's tilt angle throughout the said outer region is unimportant as far as the present invention is concerned (provided of course the magnitude of such angle is small compared to the 45-degree value that is characteristic of the said inner region). One can take advantage of such freedom, and of the therewith attainable fine control of the poloidal magnetic field in regions of space away from the central "doughnut hole", to the end of satisfying different requirements that may arise in different embodiments of the present invention.

In the considered geometry, we shall define a "single turn" as the piece of winding delimited by two subsequent crossing of the equatorial plane on the outer side (see, e.g., FIGS. 2a and 2b under the Section of the Preferred Embodiment). Because of the tilting with respect to the meridian plane, as one thus-defined single turn is developing from end to end it is also travelling a considerable angular distance in the toroidal direction (over 180 degrees, e.g., for the compact, elongated toroidal configuration which is illustrated in the figures referred to under the Section of the Preferred Embodiment). The full winding is composed of a number of such "single turns" (all equal to each other) joined end to end. For the full winding to close up neatly onto itself, after filling all the available toroidal space uniformly, the following condition must be satisfied: if $\phi$ is the toroidal angle (in degrees) travelled end to end by a single turn, and the integer n is the planned number of turns, the expression $n\phi/360$ must acquire an integer value, such integer value having no prime factors in common with the integer n. Because the desired number of turns, for electrotechnical reasons, is usually rather large (several hundreds), it is not difficult to have the above congruence condition satisfied by small adjustments either in the number of turns or in the configuration parameters (or simultaneously in both).

A tilted winding such as has been described above produces both a toroidal magnetic field, localized inside the toroidal bore of the solenoid (as a consequence of the poloidal component of the current), and a poloidal field, mainly concentrated in the solenoid's doughnut hole (as a consequence of the toroidal component of the current). Moreover, there exists a critical value of the turns' mean tilt angle in the said inner region of the solenoid (of the order of 45 degrees, but slightly changing with the configuration parameters) whereby the magnetic pressure loads respectively of the said toroidal magnetic field and of the said poloidal magnetic field over the said inner region of the solenoid are balancing each other exactly. Thus by finely tuning the turns' mean tilt angle around the said critical value one can control the magnitude (and sign) of the net radial force acting on the said inner region of the solenoid to an excellent extent. By comparison, in all toroidal magnet implementations belonging to the prior art, the centripetal force acting on the inner part of the winding is instead very large, commanding major design attentions; the same can be said of the radial force in the purely cylindrical magnets of the prior art.

As a positive consequence of the above circumstances, the external mechanical support structure need only be designed to help containing the magnetic pressure loads on the said outer region and on the said transition region of the solenoid, the said inner region being instead already in a state of mechanical equilibrium with respect to pressure loads, as previously explained.

As another positive consequence of the said circumstances, no "wedging" of the turns is required, or, in other words, in the absence of a net centripetal force the winding's turns are not required to mechanically lean against each other. The latter circumstance allows the introduction of another key feature of the present invention, consisting in the requirement that adjacent turns be made mechanically independent of each other, so that under stress each turn be guaranteed to deform as a separate, independent elastic body. And since, as a consequence of the said tilting of the turns, the segment of each turn which belongs to the said inner region of the solenoid acquires the shape of a helicoid (see, e.g., FIGS. 2a and 2b under the Section of the Preferred Embodiment), the condition that each such segment is mechanically independent of the others ultimately makes the said inner region of the winding behave like a collection of springs, being thus able to adjust to the elastic deformations (due to the magnetic and thermal expansion loads) of the external support structure without having the conducting material in the turns exceed the critical strain. By comparison, in the toroidal magnet implementations of the prior art (with the exception of the already quoted U.S. Pat. No. 4,475,096) the strain arising in the conducting material as a consequence of the (unavoidable) elastic deformation of the external support structure is always very severe, to the extent, in fact, that it often brings about the most stringent limitations on the apparatus performance (as for the said prior patent, the interposing of press means between the solenoid and the external support structure is also providing an effective device to decouple the strain in the conducting material from the deformation of the external support structure, although at the price of a considerably bulkier built than required by the present invention).

It is to be remarked that the fact that the winding's turns are not required to mechanically lean against each other, which has been previously pointed out to be true for the said inner region of the winding, is in fact also true everywhere else in the solenoid, due to the magnetic pressure producing forces on the conductor which are nowhere centripetal. As a consequence of this, if desired, appropriate ly sized channels can be fitted between adjacent turns at all positions along the turns' extension for cooling purposes, without by so doing critically altering the distribution of mechanical stresses in the conductor. Hence, with reference to the option of between-pulse cooling (see Section on "Background and Prior Art"), the above circumstance would permit a drastic shortening of the idle wait period between subsequent pulses, due to the large increase in the extension of the overall available cooling surface. More interestingly yet, the above circumstance would also allow for efficient during-pulse cooling of the conductor, if desired, which would lengthen the pulse duration and in the limit admit also, in principle, of a continuous operation of the apparatus. By comparison (as previously remarked in the Section on Background and Prior Art), the carving of cooling ducts inside the most heavily strained domains of the conductor would instead be characteristically forbidden, for structural reasons, in the framework of the previously quoted U.S. Pat. No. 4,475,096.

The invention according to the foregoing description is apt to be exploited in the field of thermonuclear research as well as in other fields. In thermonuclear applications, the toroidal field is needed for the purpose of plasma stabilization. In addition, however, most interestingly, the poloidal magnetic flux variation occurring during the ramp-up of the current in the winding can also be usefully exploited, to the end of inducing the desired toroidal plasma currents. By comparison, instead, within the framework of the prior art additional transformer windings are required to drive the desired plasma current such windings being rather arduous to fit in the throat region of a compact toroidal device (see Section on Background and Prior Art).

As for applications in fields other than thermonuclear research, the poloidal part of the generated magnetic field appears to be the present invention's most valuable feature, as it provides a magnetic field domain which is easily accessible from outside, the field in it being seemingly more intense than it would otherwise be possible to generate under quasi-stationary conditions.

PREFERRED EMBODIMENT

The present invention will now be further illustrated by the following description of one particular embodiment, given by a way of a non-limiting example with reference to the appended drawings, in which.

Figure 1:
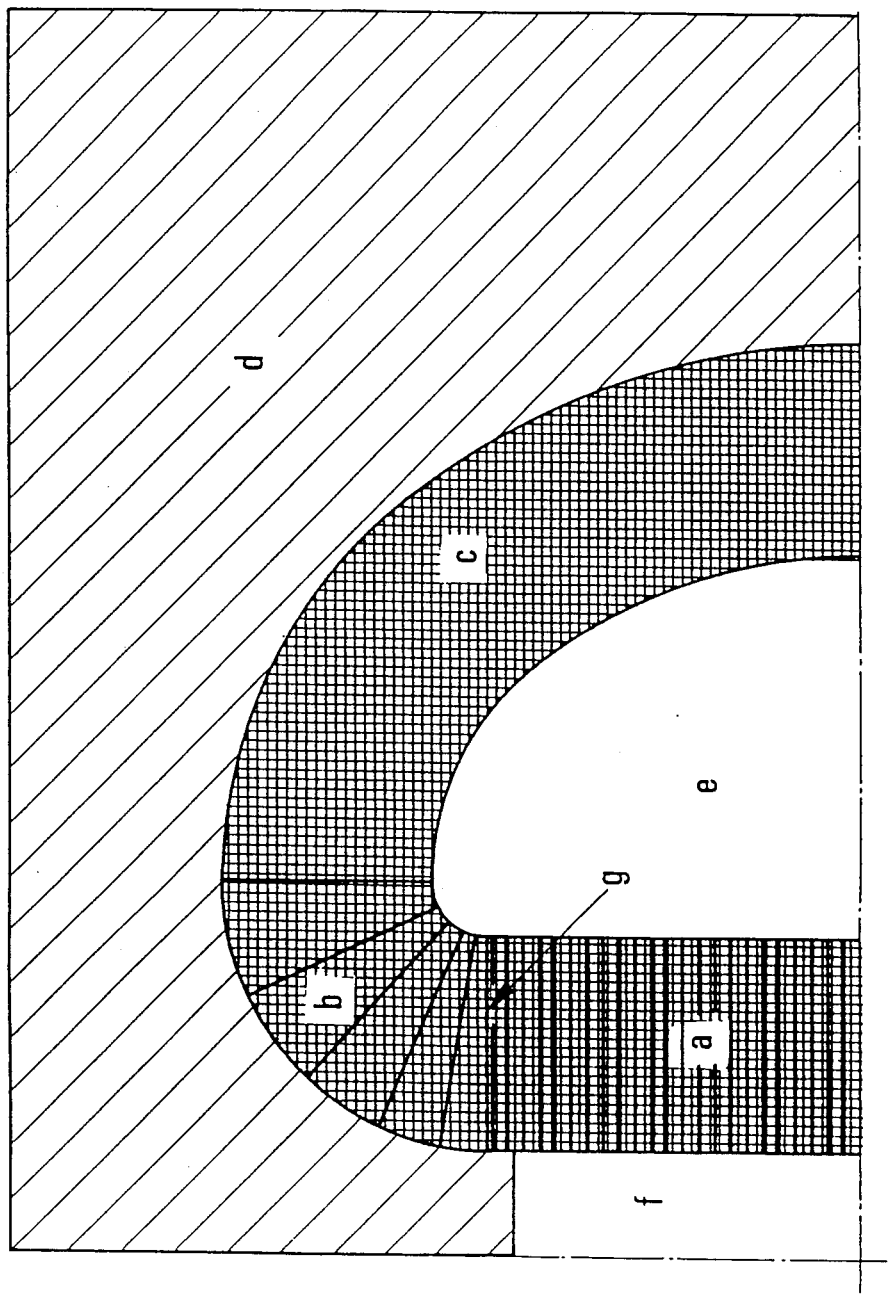
FIG. 1 is the upper-right quadrant of a meridian cross-section of the apparatus according to the preferred embodiment, in a schematic form.

With reference to FIG. 1, "a" is the inner region, or throat region, of the winding; "b" is the transition region of the winding; "c" is the outer region of the winding; "d" is the external support structure (drawn only indicatively in the figure); "e" is the solenoid's toroidal bore, where the toroidal magnetic field is mainly localized; "f" is the solenoid's doughnut hole, where the poloidal field is mainly concentrated; and "g" indicates the position of the joints in the meridian plane, two of such joints being introduced in each single turn for assembly reasons (see below).

Figure 2A:
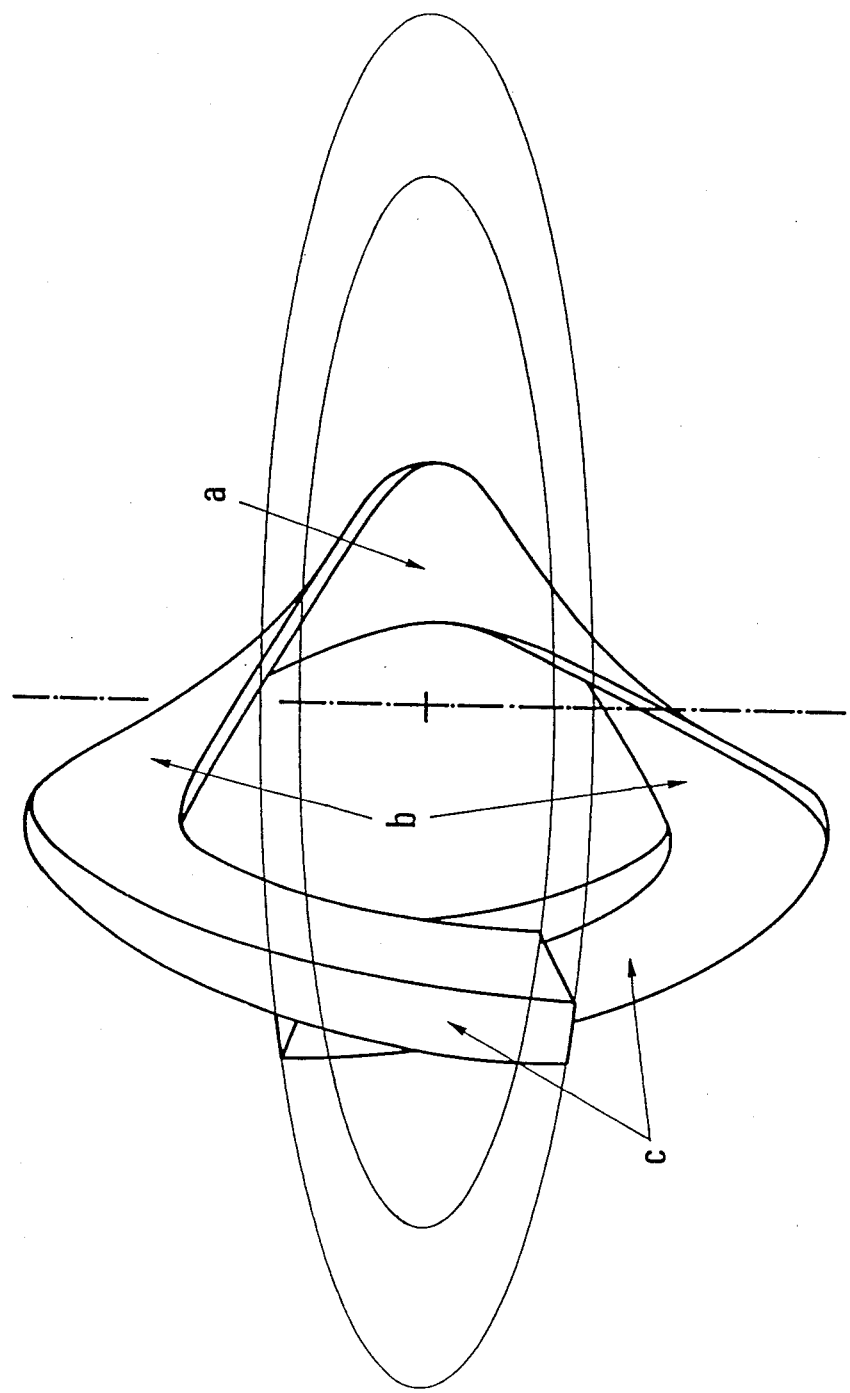
FIG. 2a is an axonometric view of a single turn of the winding according to the preferred embodiment, with nearly horizontal line of sight.
Figure 2B:
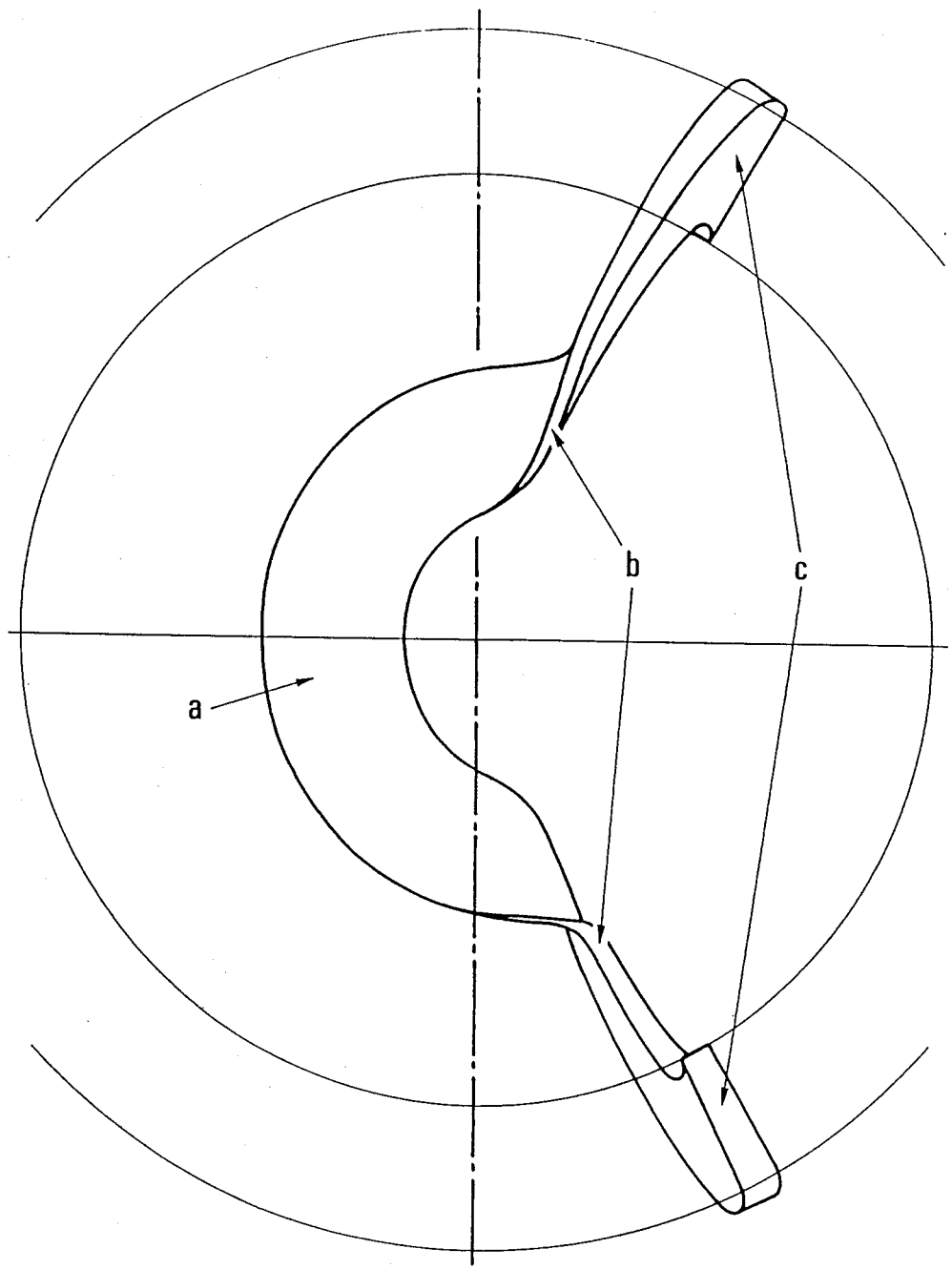
FIG. 2b is a view as in FIG. 2a, but with nearly vertical line of sight.

The features labelled "a", "b" and "c" have also been distinguished in the drawings of FIGS. 2a and 2b. With reference to the latter figures, futhermore, the turns are shown to be ribbon-like, with the width of the ribbon oriented in the radial direction and stretching across the whole width of the solenoid. Variants can be made in the form of the turns without departing from the spirit of the present invention, with all such variants falling clearly within the invention's scope.

In the considered embodiment, the toroidal bore (see feature "e" in FIG. 1) has a compact aspect-ratio and a conspicuous vertical elongation, two properties that are beneficial in thermonuclear applications, at least with reference to the so-called "tokamak" plasma-magnetic configuration (namely the plasma confinement scheme which has been most extensively investigated). Always with reference to the said tokamak configuration, moreover, the magnetic flux swing available from the poloidal field under the provisions of the considered embodiment is more than would be required to drive the needed toroidal plasma current.

In the considered embodiment, the turns' tilt angle over the whole of the outer region of the winding has been set equal to zero. Such choice, whenever compatible with the different operational requirements that may be introduced in different applications, clearly simplifies the procedure of construction of the apparatus.

In the considered embodiment, the inner region of the winding (feature "a" in FIG. 1) is developing vertically as a straight cylinder. Hence the segment of each turn which belongs to such said inner region (feature "a" in FIGS. 2a and 2b) is a regular cylindrical helicoid, a shape, namely, which is invariant with respect to a specific rigid helical motion. On account of the latter feature, the following assembly procedure can be devised. The turns' segments which belong to the said inner region of the winding are separately constructed, and so are the complementary pieces of the winding (C-shaped pieces, with the two ends bent away from the meridian plane in opposite directions). Then the said cylindrical inner region of the solenoid is assembled first, out of all the said inner turn segments, an operation which is made easy by the above mentioned property of spatial invariance: each one of the said inner turn segments can in fact be swung neatly into place by having it perform the rigid motion with respect to which it is invariant in form, such motion being clearly always unimpeded, irrespective of the number of the other inner turn segments which may be already in position. Next, any apparatus which one may wish to fit inside the solenoid's toroidal bore is assembled, and finally the complementary C-shaped pieces of the winding are moved in radially and joined, each one to a pair of different inner turn segments. In performing all this, of course, due steps have to be taken to ensure the intended electrical insulation.

I claim:

1. Apparatus for simultaneously generating an intense toroidal magnetic field and an intense poloidal magnetic field in a compact aspect-ratio configuration and quasi-stationarily in time, characterized in that it consists of a current-carrying toroidal solenoid and an external mechanical support structure; in the said solenoid three regions endowed with different features being distinguished, the nearest of said regions to the axis of symmetry (inner region, or throat region) being characterized in that therein the turns of the solenoid are tilted approximately 45 degrees relative to the meridian plane, the intermediate among the said three regions (transitions region) ensuring a smooth variation of the said tilt angle in the domain between the other two regions, and the farthest of said regions from the axis of symmetry (outer region) being characterized in that the value of the said tilt angle is therein substantially smaller than 45 degrees and other-wise arbitrary; all three of the said regions of the solenoid concurrently producing a powerful toroidal magnetic field inside the solenoid's toroidal bore because of the meridian component of the current, and the said inner region of the solenoid producing also a powerful poloidal magnetic field in the solenoid's doughnut hole because of the toroidal component of the current; the said inner region of the solenoid being radially in a state of balanced mechanical equilibrium due to the pressures of the toroidal and poloidal magnetic fields opposing out each other, with therefore the said external mechanical support structure not being called upon to act on the said, most critical inner region of the solenoid, and with the winding's turns not necessarily being therein required to mechanically lean against each other.

2. Apparatus according to claim 1 with the winding's turns being specifically required not to mechanically lean against each other in the said inner region of the solenoid, endowing hence each helicoidally shaped turn segment belonging to the said inner region with spring-like characterists with respect to displacements in the direction of the configuration's axis of symmetry, and thus enabling the said inner region of the solenoid to adjust to even large elastic deformation under load of the external support structure without having the conducting material in the turns exceed the critical strain.

3. Apparatus according to claim 2 with cooling channels being in addition provided between adjacent turns, as made possible by the turns not being mechanically leaning against each other.

* * * * *